UNITED STATES PATENT OFFICE.

FREDERICK W. GERDES, OF ALLEGHENY CITY, PENNSYLVANIA.

IMPROVEMENT IN THE MANUFACTURE OF PAINTS.

Specification forming part of Letters Patent No. 110,027, dated December 13, 1870; reissue No. 5,669, dated November 25, 1873; application filed November 17, 1873.

*To all whom it may concern:*

Be it known that I, FREDERICK W. GERDES, of Allegheny City, in the county of Allegheny and State of Pennsylvania, have invented a new and useful Improvement in the Manufacture of Paints; and I do hereby declare the following to be a full, clear, and exact description thereof.

My improved paint is designed more particularly for painting carbon-oil barrels, or other articles subject to the action of such oil.

In the oil trade, thousands of barrels are required for barreling the refined oil, and a barrel adapted to such use must not only be lined inside with some non-soluble composition, but also be painted outside with some durable paint.

As linseed-oil is somewhat costly, efforts have been made to substitute for it benzine, or other of the lighter and less valuable products of the distillation of crude oil; but it has been found that, unless a considerable quantity of linseed-oil be used, the paint so made lacks the desired body, rubs off easily, and, as the proportion of linseed-oil is lessened, becomes more and more soluble by the carbon oil.

After numerous experiments, I have found that finely pulverized or powdered argillite or argillaceous shale or slate, introduced into paint prepared wholly or in part with benzine, or other like distillate, and resin, as a substitute for linseed-oil, possesses the necessary body, and is sufficiently adhesive and non-soluble to answer the uses referred to.

In manufacturing, I prepare the paint in any of the ways known to the art, and use any known materials, except that, for about one-half, by measure, of the white lead or zinc, or other white base commonly used, I substitute about an equal quantity, more or less, of finely pulverized or powdered argillite or argillaceous slate or shale, by doing which I am enabled to dispense with a part or the whole of the linseed-oil commonly used, and substitute therefor benzine, or other of the lighter and comparatively valueless products of the distillation of petroleum.

The benzine or other like distillate may be introduced at any desired stage of the manufacture; but I prefer to introduce it in the shape of resin varnish, which is made by dissolving resin in such distillate. If no linseed-oil be used, the white lead or zinc-white and the argillite, either separately or mixed together, may be ground in with the resin varnish; or a small quantity of linseed-oil may be used in grinding, and the benzine or benzine varnish be introduced afterward.

While the proportions of the resin and benzine may be varied somewhat, I have found that a mixture formed by dissolving about five pounds of resin to a gallon of benzine gives satisfactory results in the uses set forth.

The coloring matter is introduced at any desired stage of the process, and the work otherwise carried on in the usual way.

In this way I produce a paint having the required body and hardness, and sufficiently adhesive and non-soluble for the uses set forth. But I do not limit my improvement to the use of the argillite in connection with the distillates referred to, since the desired quality of paint can be secured at a reduced cost by merely substituting powdered argillite for a portion of the white lead or zinc-white, and mixing them up with linseed-oil; but a still greater saving is effected by the use of benzine or other like distillate in connection with the argillite, as already set forth.

What I claim as my invention, and desire to secure by Letters Patent, is—

1. Argillite or argillaceous slate, in combination with white lead or oxide of zinc, in the manufacture of paints, substantially as set forth.

2. The combination of argillite or argillaceous slate, Prussian blue, or other equivalent blue pigment, white lead or zinc-white, and linseed-oil, so as to form a blue paint for oil-casks and other articles, substantially as set forth.

3. As an ingredient in the manufacture of paints, resin varnish prepared by dissolving resin in benzine, or other like distillate, and incorporated with the body of the paint before grinding, substantially as set forth.

4. The combination, by means of grinding, of resin varnish, prepared as described, with white lead or oxide of zinc, in the manufacture of paint, substantially as set forth.

In witness whereof I, the said FREDERICK W. GERDES, have hereunto set my hand.

FREDERICK W. GERDES.

Witnesses:

T. B. KERR,

FRED. STANDISH.